(12) United States Patent
Nakayama et al.

(10) Patent No.: US 8,520,092 B2
(45) Date of Patent: *Aug. 27, 2013

(54) IMAGE PICKUP APPARATUS INCLUDING AUTOMATIC WHITE BALANCE CONTROL CAPABILITY

(75) Inventors: Satoshi Nakayama, Kanagawa-ken (JP); Hiromi Matsuda, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 13/173,751

(22) Filed: Jun. 30, 2011

(65) Prior Publication Data

US 2011/0254975 A1  Oct. 20, 2011

Related U.S. Application Data

(60) Division of application No. 11/683,658, filed on Mar. 8, 2007, now Pat. No. 7,995,111, which is a division of application No. 10/640,609, filed on Aug. 13, 2003, now Pat. No. 7,212,235, which is a division of application No. 09/009,101, filed on Jan. 20, 1998, now Pat. No. 6,621,519, which is a continuation of application No. 08/424,811, filed on Apr. 19, 1995, now abandoned.

(30) Foreign Application Priority Data

Apr. 26, 1994 (JP) .............................. HEI 06-088599

(51) Int. Cl.
*H04N 9/73* (2006.01)
(52) U.S. Cl.
USPC .................................... 348/223.1; 348/224.1
(58) Field of Classification Search
USPC .............. 348/223.1, 224.1, 225.1, 228, 222.1
See application file for complete search history.

(56) References Cited

U.S. PATENT DOCUMENTS

| | | | | |
|---|---|---|---|---|
| 5,177,599 A * | 1/1993 | Takagi et al. | ............... | 348/228.1 |
| 5,267,026 A * | 11/1993 | Kawahara et al. | .......... | 348/223.1 |
| 5,319,449 A * | 6/1994 | Saito et al. | ................. | 348/223.1 |
| 5,329,361 A * | 7/1994 | Matsui et al. | ................. | 348/655 |
| 5,420,630 A * | 5/1995 | Takei | .......................... | 348/223.1 |
| 5,555,022 A * | 9/1996 | Haruki et al. | .............. | 348/223.1 |
| 6,108,037 A * | 8/2000 | Takei | .......................... | 348/224.1 |
| 6,522,353 B1 * | 2/2003 | Saito et al. | ................. | 348/223.1 |
| 6,621,519 B2 * | 9/2003 | Nakayama et al. | ......... | 348/223.1 |
| 7,212,235 B2 * | 5/2007 | Nakayama et al. | ......... | 348/223.1 |
| 7,995,111 B2 * | 8/2011 | Nakayama et al. | ......... | 348/223.1 |

* cited by examiner

*Primary Examiner* — Nhan T Tran
(74) *Attorney, Agent, or Firm* — Cowan, Liebowitz & Latman, P.C.

(57) ABSTRACT

An image pickup apparatus such as a video camera has the capability of automatic white balance control whereby the white balance is quickly adjusted for any object even just after an operator has turned on a power supply. An image pickup element converts an optical image of an object into an electrical image signal. The image signal is applied to a signal processing circuit and separated into a luminance signal and color signals. The separated color signals or the R and B signals are amplified by gain control circuits under the control of the correction signals supplied by a correction signal computing part, and then applied to a color-difference signal forming circuit which in turn produces color-difference signals (R-Y) and (B-Y). An encoder circuit generates a television signal in the standard form from the above color-difference signals and the luminance signal. In this processing, the white balance is adjusted according to a white balance control signal generated on the basis of information about a state of illuminance onto an object picked up last time and stored in a data storing part.

7 Claims, 6 Drawing Sheets

WHITE EXTRACTING RANGE FOR INDOOR SCENE

WHITE EXTRACTING RANGE FOR OUTDOOR SCENE

WHITE EXTRACTING RANGE FOR UNDISCRIMINABLE SCENE

IMAGE PICKUP APPARATUS INCLUDING AUTOMATIC WHITE BALANCE CONTROL CAPABILITY

CROSS-REFERENCE TO RELATED APPLICATIONS

This application is a divisional of application Ser. No. 11/683,658, now U.S. Pat. No. 7,995,111, filed Mar. 8, 2007, which is a divisional of application Ser. No. 10/640,609, filed Aug. 13, 2003, now U.S. Pat. No. 7,212,235, which is a divisional of Ser. No. 09/009,101, filed Jan. 20, 1998, now U.S. Pat. No. 6,621,519, which is a continuation of Ser. No. 08/424,811, filed on Apr. 19, 1995, now abandoned, the entire disclosures of which are hereby incorporated by reference.

BACKGROUND OF THE INVENTION

1. Field of the Invention

The present invention relates to an image pickup apparatus such as a video camera.

2. Description of the Related Art

In conventional image pickup apparatus such as video cameras, one known technique of automatic white balance adjustment is to perform feedback control such that, for example, color-difference signals become zero.

Under usual conditions where the image of an object is being picked up continuously, a state of illumination onto the object correctly reflects the image pickup operation. However, in some cases, a state of illumination onto an object cannot be identified. Such a problem occurs for example in a certain time period just after the power has been turned on. In this case, the white extraction should be performed over a wide range since there are various possibilities regarding the type of light source illuminating the object. The expansion of the white extracting range for a certain time period after an image pickup operation has been started causes an increase in time required to correctly adjust the white balance.

SUMMARY OF THE INVENTION

In view of the above problem, it is an object of the present invention to provide an image pickup apparatus having the capability of automatic white balance adjustment whereby the white balance can be quickly and correctly adjusted for an arbitrary object even just after the power supply has been turned on.

According to an aspect of the invention to achieve the above object, there is provided an image pickup apparatus comprising: image pickup means for converting an optical image of an object into an electrical image signal; a signal processing circuit for recording the image signal from the image pickup means; storage means for storing information about a state of the object obtained in process of recording; and control means for comparing a state of an object obtained immediately after turning on a power supply with the information stored in the storage means and for controlling an image pickup condition according to a comparison result.

According to another aspect of the invention, there is provided an image pickup apparatus comprising: image pickup means for picking up an image of an object; display means for displaying an output of the image pickup means; detecting means for detecting whether the object is being observed via the display means; storage means for storing a state of the object in response to an output of the detecting means; and control means for comparing a state of an object obtained immediately after turning on a power supply with the state of the object stored in the storage means and for controlling an image pickup condition according to a comparison result.

With the above arrangements according to the present invention, it is determined whether a new object to be recorded just after turning on the power supply is identical to the object that was recorded in the previous operation just before the power supply was turned off, and if the new object is almost identical to the previous object, an image pickup condition can be determined quickly by referring to the previous image pickup condition obtained just before the power supply was turned off.

Other objects and aspects of the invention will become more apparent from the following description of embodiments with reference to the accompanying drawings.

DESCRIPTION OF THE EMBODIMENT

Figure 1:
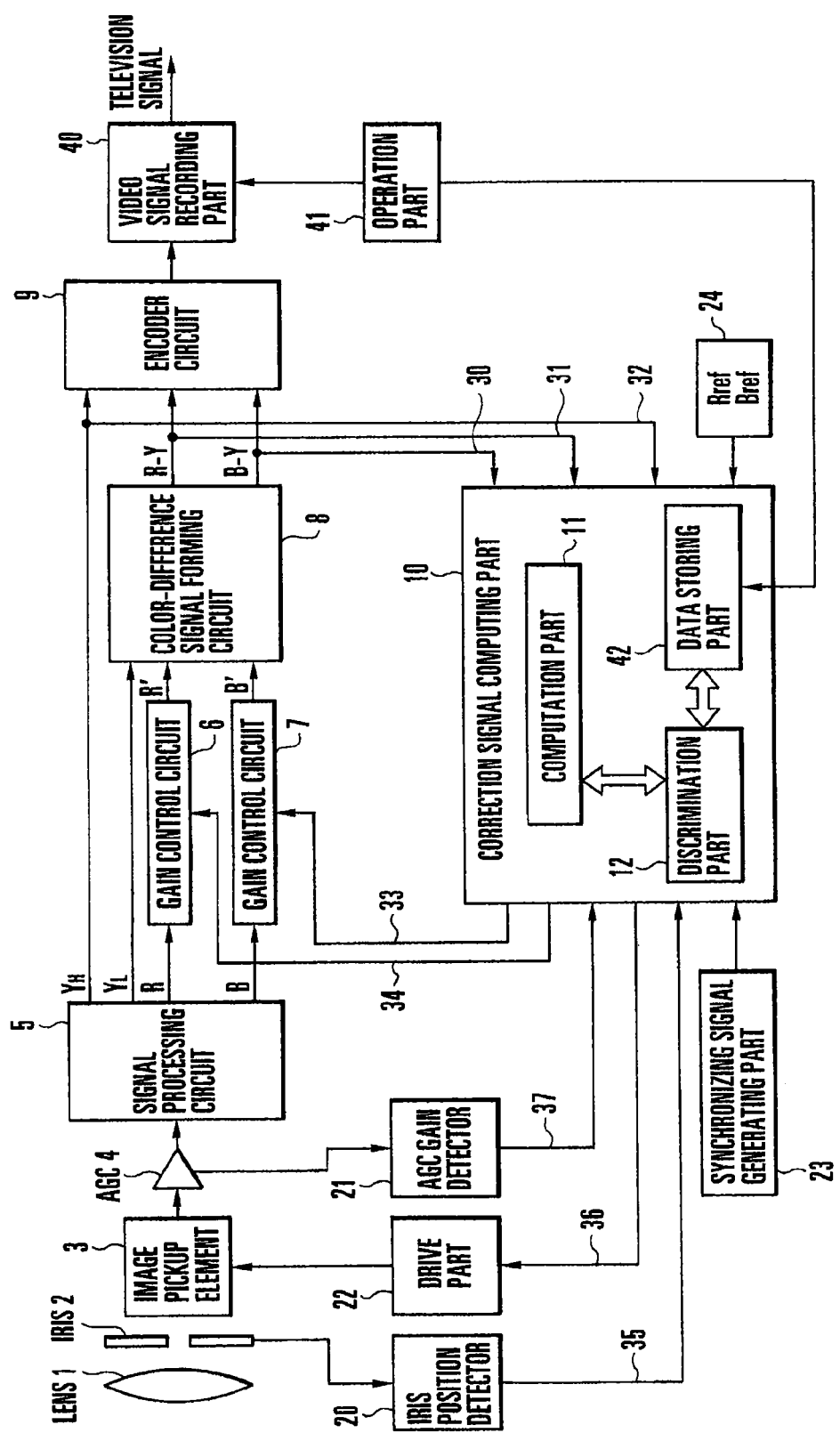
FIG. 1 is a block diagram of one embodiment according to the present invention.

FIG. 1 is a block diagram illustrating a video camera provided with automatic white balance adjustment means, according to the present invention.

In FIG. 1, reference numeral 1 denotes a lens for forming an image of an object, reference numerals 2 denotes an iris, reference numeral 3 denotes an image pickup element for photoelectrically converting an optical image of the object to an electric signal wherein the optical image is formed via the lens 1 and the iris 2, reference numeral 4 denotes an AGC amplifier (automatic gain control circuit) provided with a feedback loop for amplifying the output signal of the image pickup element 3 to a proper signal level, reference numeral 5 denotes a signal processing circuit for generating a luminance signal and color signals from the image signal which is picked up by the image pickup element 3 and amplified by the AGC amplifier 4, reference numerals 6 and 7 denote gain control circuits for controlling the gains associated with red and blue signals R and B which are two of the above color signals, reference numeral 8 denotes a color-difference signal forming circuit for forming color-difference signals (R-Y) and (B-Y) from the output signal of the signal processing circuit 5, reference numeral 9 denotes an encoder circuit for converting the luminance signal and the color-difference signals to a television signal in a standard form and then outputting the resulting television signal, and reference numeral 10 denotes a correction signal computing part for computing a correction signal for use in the white balance control and outputting the resulting correction signal, wherein the correction signal computing part 10 includes a computation part 11 for performing a basic computation associated with the white balance control and a discrimination part 12 for discriminating a state of illumination onto the object.

Furthermore, reference numeral 20 denotes an iris position detector for detecting the position of the iris 2, reference numeral 21 denotes an AGC gain detector for detecting the gain of the AGC amplifier 4, reference numeral 22 denotes an image pickup element drive part for driving the image pickup element 3, reference numeral 23 denotes a synchronizing signal generating part for generating a synchronizing signal to control the timing of the computing operation of the correction signal computing part 10, and reference numeral 24 denotes a reference value generating part for generating white balance reference values Rref and Bref according to which the correction signal is computed.

In FIG. 1, there are also shown color-difference signals (B-Y) and (R-Y) denoted by reference numerals 30 and 31 and a luminance signal Y denoted by reference numeral 32, which are applied to the correction signal computing part 10 for use in the white balance adjustment, a B gain correction signal 33 and an R gain correction signal 34 which are generated by the correction signal computing part 10 and applied to the gain control circuits 6 and 7, respectively, an iris position signal 35 generated by the iris position detector 20, a driving signal 36 which controls the image pickup element driving part 22, and an AGC gain signal 37 generated by the AGC gain detector 21.

Furthermore, in FIG. 1, reference numeral 40 denotes a video signal recording part for recording a video signal generated from the output of the signal processing circuit 5 via the encoder circuit 9, and reference numeral 41 denotes an operation part via which the starting and stopping or turning-on and turning-off operations of the video signal recording part 40 are controlled.

In the video camera configured in the above-described manner, an optical image formed on the image pickup element 3 is converted to an electrical signal. The image signal is then amplified by the AGC amplifier 4 to a proper signal level and applied to the signal processing circuit 5. The signal processing circuit 5 generates a high-frequency component YH of the luminance signal, a low-frequency component YL of the luminance signal, a red signal R, and a blue signal B. The signals R and B are applied to the gain control circuits 6, 7, respectively, and amplified under the control of the correction signals 33 and 34 supplied by the correction signal computing part 10, thereby adjusting the white balance. The resultant color signals R' and B' are applied to the color-difference signal forming circuit 8 and the luminance signal YL is also applied to the color-difference signal forming circuit 8. The color-difference signal forming circuit 8 forms color-difference signals (R-Y) and (B-Y) from these input signals.

The color-difference signals (R-Y) and (B-Y) as well as the luminance signal YH are applied to the encoder circuit 9 which in turn generates a television signal in the standard form. The color-difference signals (R-Y) and (B-Y) are also applied to the correction signal computing part 10. The correction signal computing part 10 performs a basic calculation required for controlling the white balance in such a manner that the input color-difference signals (R-Y) 31 and (B-Y) 30 are compared with the reference values Rref and Bref corresponding to white wherein the reference values are supplied by the reference value generating part 24, thereby obtaining white balance correction data. The correction data or R and B gain correction signals 34 and 33 calculated by the correction signal computing part 10 are applied to the gain control circuits 6 and 7, respectively, so that the white balance is correctly controlled.

In the computation of the correction signal, the chromatic effects are avoided by extracting a color close to white from the signals R-Y, B-Y, YH supplied by the signal processing circuit 5 and the operation is controlled so that the average of these signals becomes zero. To avoid undesirable chromatic effects on the white balance, undesirable color components are detected and the white balance is corrected using a weighted average value of these color components.

Figure 2:
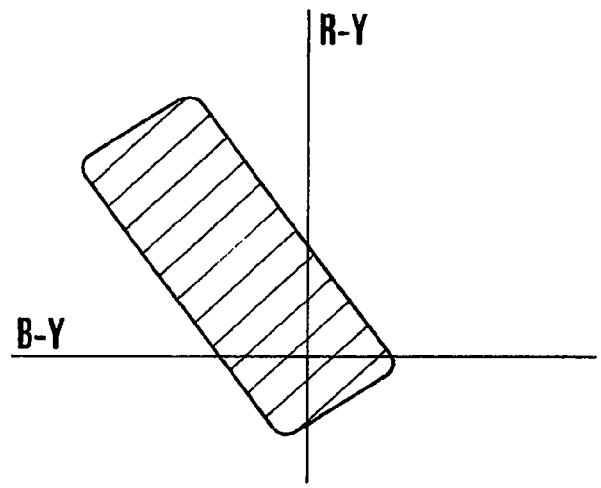
FIG. 2 is a schematic diagram illustrating a white extracting range for an indoor scene.
Figure 3:
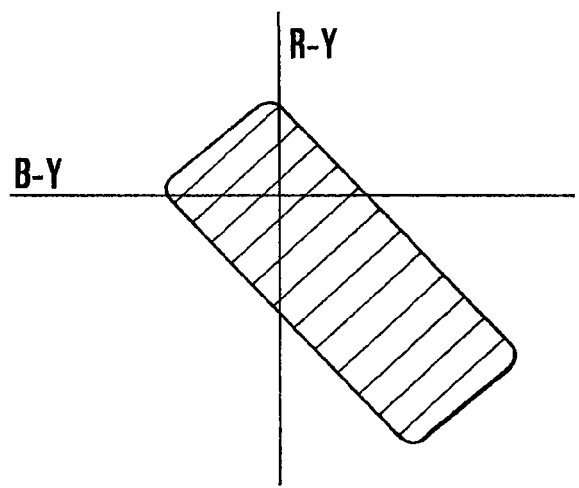
FIG. 3 is a schematic diagram illustrating a white extracting range for an outdoor scene.

This means that the white balance is adjusted while taking into account the color and luminance components of the entire picture. In this technique, the discrimination part 12 determines, from a state of illumination onto an object, whether the object is situated outdoors where the color temperature is relatively high or situated indoors where the color temperature is low. This leads to an improvement in white extraction accuracy. For example, in the case of an outdoor object having a high color temperature, the white color range is located near blue as shown in FIG. 3. On the other hand, in the case of an indoor object having a low color temperature, the white color range is located near orange as shown in FIG. 2.

Reference numeral 42 denotes a data storing part for holding information about a state of illumination onto an object, etc., obtained in process of the image pickup operation, by storing information associated with signals 30-37 computed in the correction signal computing part 10.

The operation part 41 shown in FIG. 1 includes object detecting means for detecting whether an object whose image is being picked up is a correct one that an operator intends to pick up, and control means for controlling the operation of the data storing part 42 at the beginning or the end of the recording operation of the video signal recording part 40.

The information about a state of illumination onto an object includes a white balance control signal generated from the color signals supplied by the signal processing circuit 5, a luminance (level) signal, and information about illuminance of the object such as the iris position, automatic gain control, and electronic shutter conditions.

The operation of the video camera according to the invention will be described below. A picked-up image signal obtained by the photoelectric conversion performed by the image pickup element 3 is applied to the signal processing circuit 5 and separated into a luminance signal and color signals. The white balance is then adjusted, and the encoder circuit 9 finally generates a television signal in the standard form, wherein the television signal is recorded by the video signal recording part 40.

In FIG. 1, the iris position detector 20 such as a Hall element produces an output voltage in such a manner that the output voltage becomes highest when the iris is fully open and lowest when the iris is fully closed. The AGC gain detector 21 detects an AGC feedback voltage of the AGC amplifier 4 and generates an output signal representing the gain control state. The image pickup element drive part 22 is controlled by the correction signal computing part 10 in such a manner that the charge accumulation time of the image pickup element 3 is varied so that exposure is controlled properly by an electronic shutter operation. This means that the correction signal computing part 10 knows the various amounts of control regarding the iris position, the AGC, and the electronic shutter, etc., and thus can identify the illuminance of the object.

The computation part 11 compares the color-difference signals (R-Y) 31 and (B-Y) 30 with the reference values Rref and Bref corresponding to white, and calculates the white balance correction data from the comparison results. Thus, the computation part 11 outputs the R gain correction signal 34 and the B gain correction signal 33 which are used to control the white balance. When the signals (R-Y) 31 and (B-Y) 30 are equal to the reference values (Rref, Bref) 24, the color temperature of an object can be determined.

In general, when an object is situated outdoors and illuminated with sunlight, the object has a high illuminance and a high color temperature. In contrast, when an object is situated indoors and illuminated with light emitted by an artificial light source, the object has a rather low illuminance and a low color temperature. Therefore, if a state of illumination onto the object is known, it is possible to classify the light sources into a few types including the outdoor and indoor light sources.

Thus, the discrimination part 12 can roughly identify the light source judging from information about the state of illumination onto the object, thereby facilitating the white balance adjustment and the white extracting range computation by the computation part 11.

As in conventional video cameras, an operator can control via the operation part 41 the operations such as turning on and off of the power supply and starting and stopping of recording so that the video signal recording part 40 can record a video signal generated by the encoder circuit 9.

Figure 6:
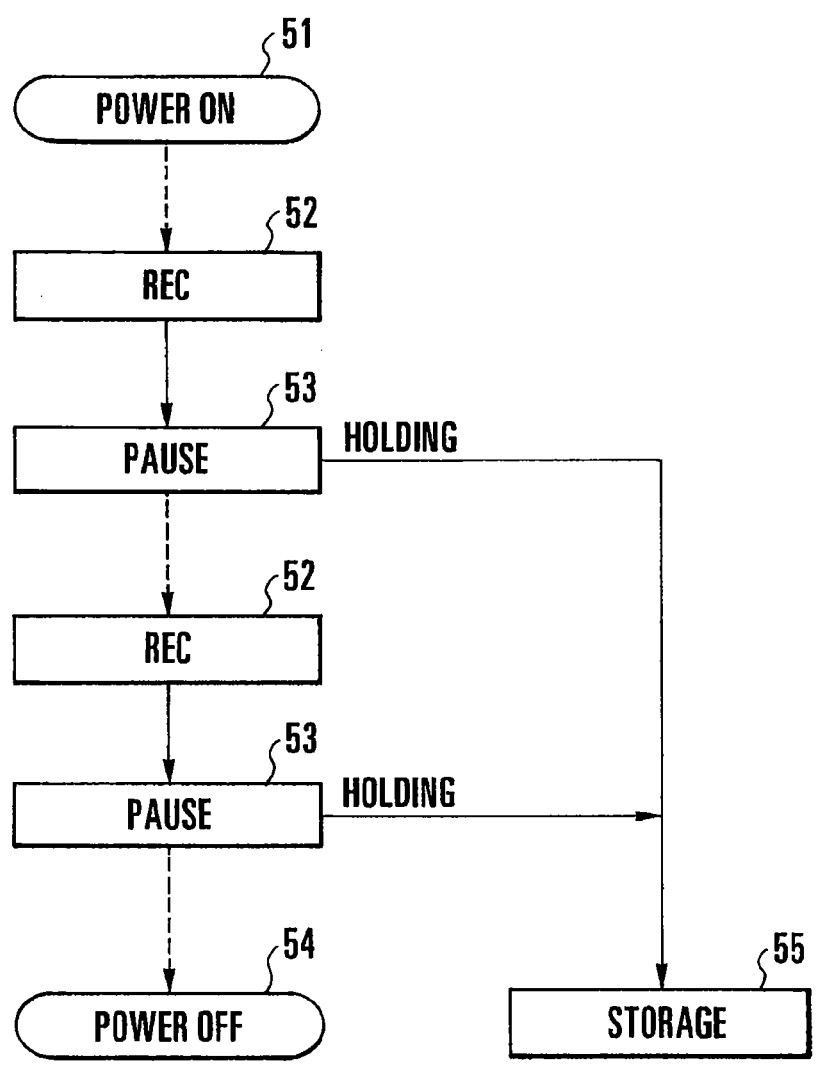
FIG. 6 is a flow chart illustrating a process relating to the embodiment of the invention.

FIG. 6 is a flow chart of the process according to the invention, illustrating the timing of the operation of storing various items of information in the data storing part 42 according to the operation of the operation part 41. In step 51, the power supply is turned on, and then recording is started in step 52. In step 53, the recording is stopped and the related data is held (stored). In a case where recording is performed a plurality of times, the data is held for each recording operation. When, in step 54, the power supply is turned off, the above data is stored in step 55.

The above-described data is held even after the main power supply is turned off, so that the data can be used when the power supply is turned on next time. In the above example, the data is held at the end of a recording operation. Alternatively, the data may also be held at the beginning of a recording operation or in the middle of the recording operation. The data to be held includes such data representing the illuminance and color temperature of an object. More specifically, the data includes the information on the iris position, the AGC conditions, the electronic shutter conditions, the R and B gain correction signals, the color-difference signals, and the luminance signal. Information on the illumination modified or derived from the above information may also be employed.

The information to be held should correspond exactly to the object an operator intends to pick up. When an outdoor scene is picked up, the ground, for example, may be picked up unintentionally. If the data relating to the scene of the ground is stored, then the data will represent a dark illuminance and a color which will affect the white balance control, and thus, against the intention of the operator, the data cannot tell that the object is situated outdoors. To avoid this problem, it is required to correctly select data including information of an object which the operator really intends to pick up. This can be achieved by storing data obtained at a proper time in the middle of a recording operation.

The data recorded in the above-described manner is used as follows. As described earlier, the conventional video cameras have a problem with the white balance control in a recording operation just after the power supply is turned on. If it is known whether an object to be picked up is situated outdoors or situated indoors while being illuminated with an artificial light source, then it is possible to achieve a great improvement in the accuracy of the white balance control in an image pickup operation just after the power supply is turned on. If the last image pickup operation was performed outdoors, then there is a high probability that the next image pickup operation will also be performed outdoors. Thus, in this invention, if the last image pickup operation was performed outdoors and if it is turned out that an object has a high illuminance in the next image pickup operation when the power supply is turned on, then it is decided that the image pickup operation is now being performed outdoors.

Figure 7:
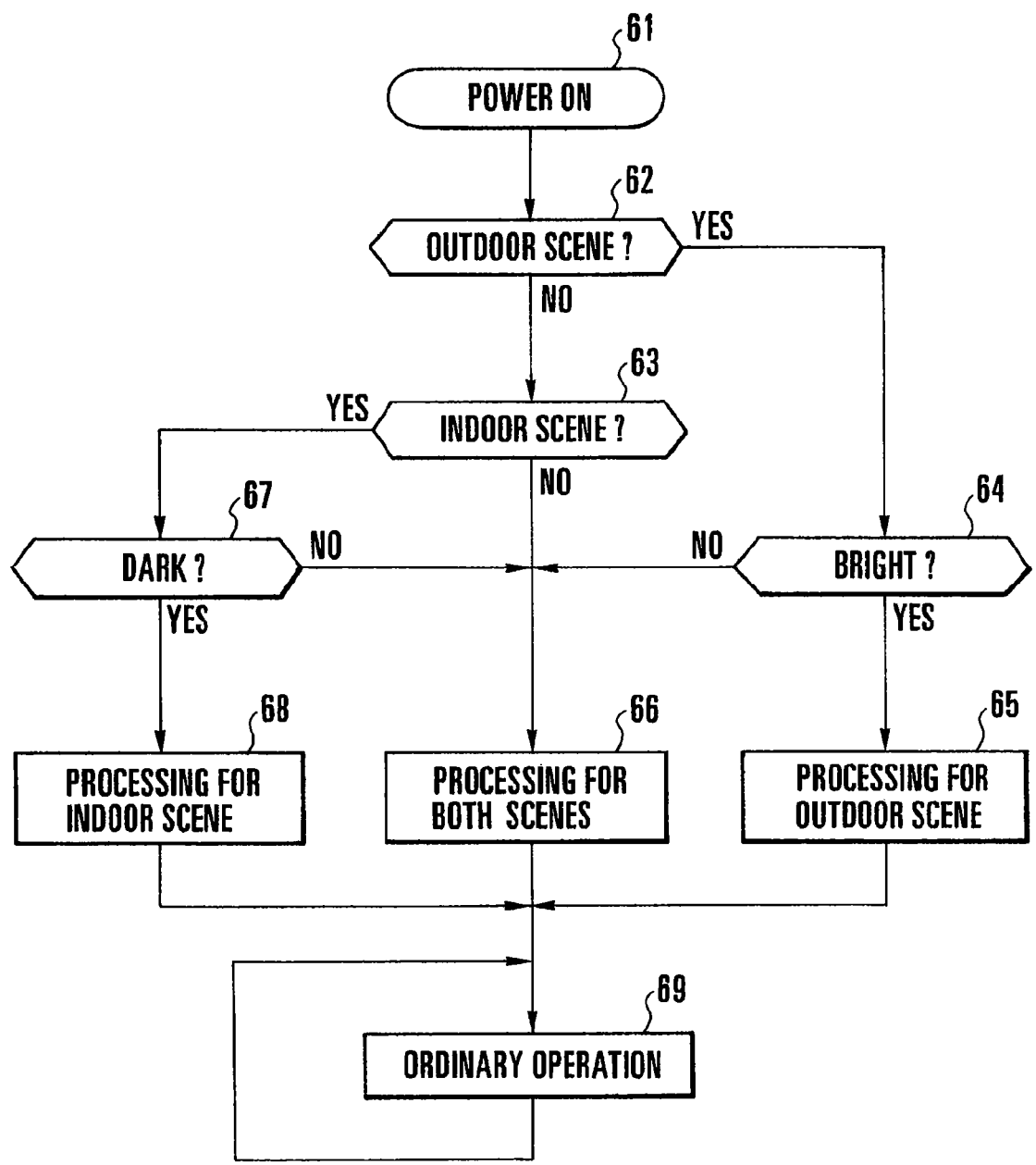
FIG. 7 is a flow chart illustrating a process relating to a discrimination part.

FIG. 7 is a flow chart illustrating the operation of the discrimination part 12 relating to the white balance control performed just after the power supply is turned on. In step 61, the power supply is turned on and then, immediately after that, the discrimination part 12 determines the type of a light source on the basis of the data relating to the last image pickup operation stored in the data storing part 42 of the correction signal computing part 10. More specifically, in step 62, it is determined whether the last image pickup operation was performed outdoors. If no, in step 63, it is determined whether the image pickup operation was performed indoors.

In the above judgement whether the image pickup operation was performed outdoors, if the data shows that the object picked up in the last time had an illuminance and a color temperature greater than an outdoor level, then it is concluded that the image pickup operation was performed outdoors. In this case, it is further determined in step 64 whether the current illuminance is greater than the outdoor level. If yes, then an outdoor process is performed in step 65. On the other hand, in the above judgement of whether the image pickup operation was performed outdoors, if the data shows that the object picked up last time had an illuminance and a color temperature lower than the outdoor level, then it is determined whether the image pickup operation was performed indoors. In this determination, if the data shows that the object picked up last time had an illuminance and a color temperature lower than the indoor level, then it is concluded that the image pickup operation was performed indoors. In this case, it is further determined in step 67 whether the current illuminance is lower than the outdoor level. If yes, then an indoor process is performed in step 68. If the conclusion is "no" in both outdoor and indoor judgements, then the process is performed in step 66 such that the image pickup operation is correctly performed for either case.

Figure 4:
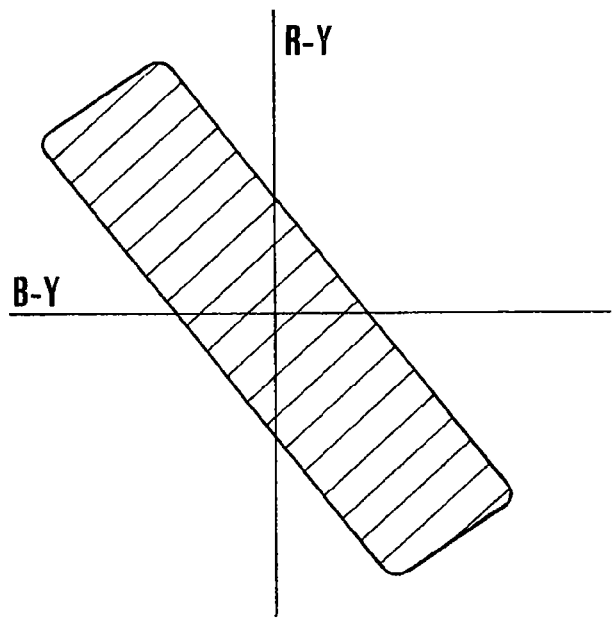
FIG. 4 is a schematic diagram illustrating a white extracting range for an object which cannot be identified whether the object is situated outdoors or indoors.
Figure 5:
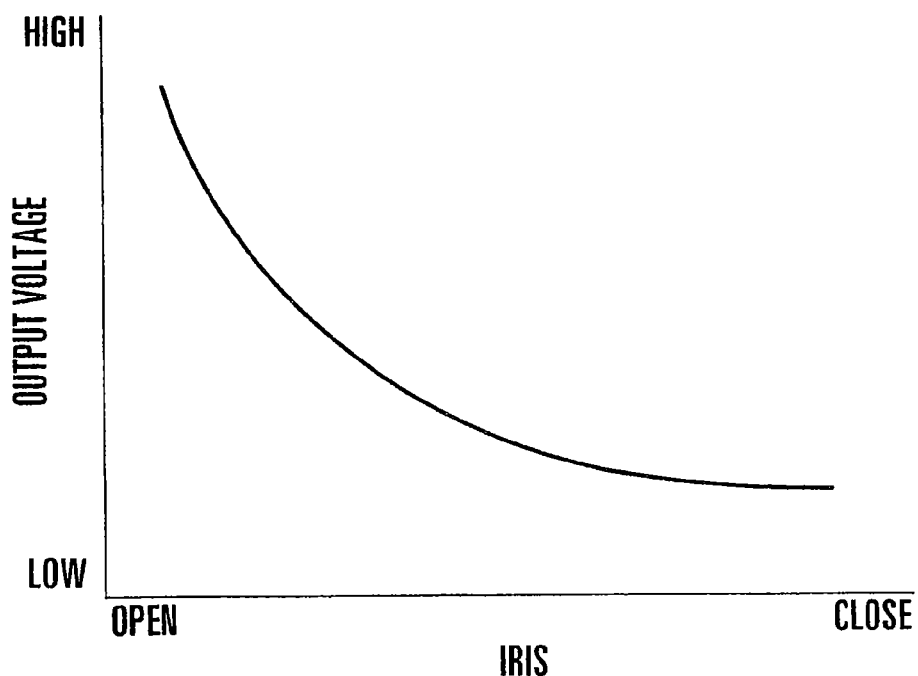
FIG. 5 is a schematic diagram illustrating the output of an iris position detector.

In the outdoor process in step 65, the white balance is adjusted by employing the white extracting range shown in FIG. 3. Similarly, in the indoor process in step 68, the white balance is adjusted by employing the white extracting range shown in FIG. 2. In the case where it is impossible to identify whether the image pickup operation is performed outdoors or indoors, the white balance is adjusted by employing the white extracting range shown in FIG. 4. After the white balance adjustment, an ordinal operation is performed in step 69.

In the example described above, the light sources are classified into three types: outdoor illumination, indoor illumination, and unidentified illumination. However, the light sources may also be classified into two types or four or more types.

Figure 8:
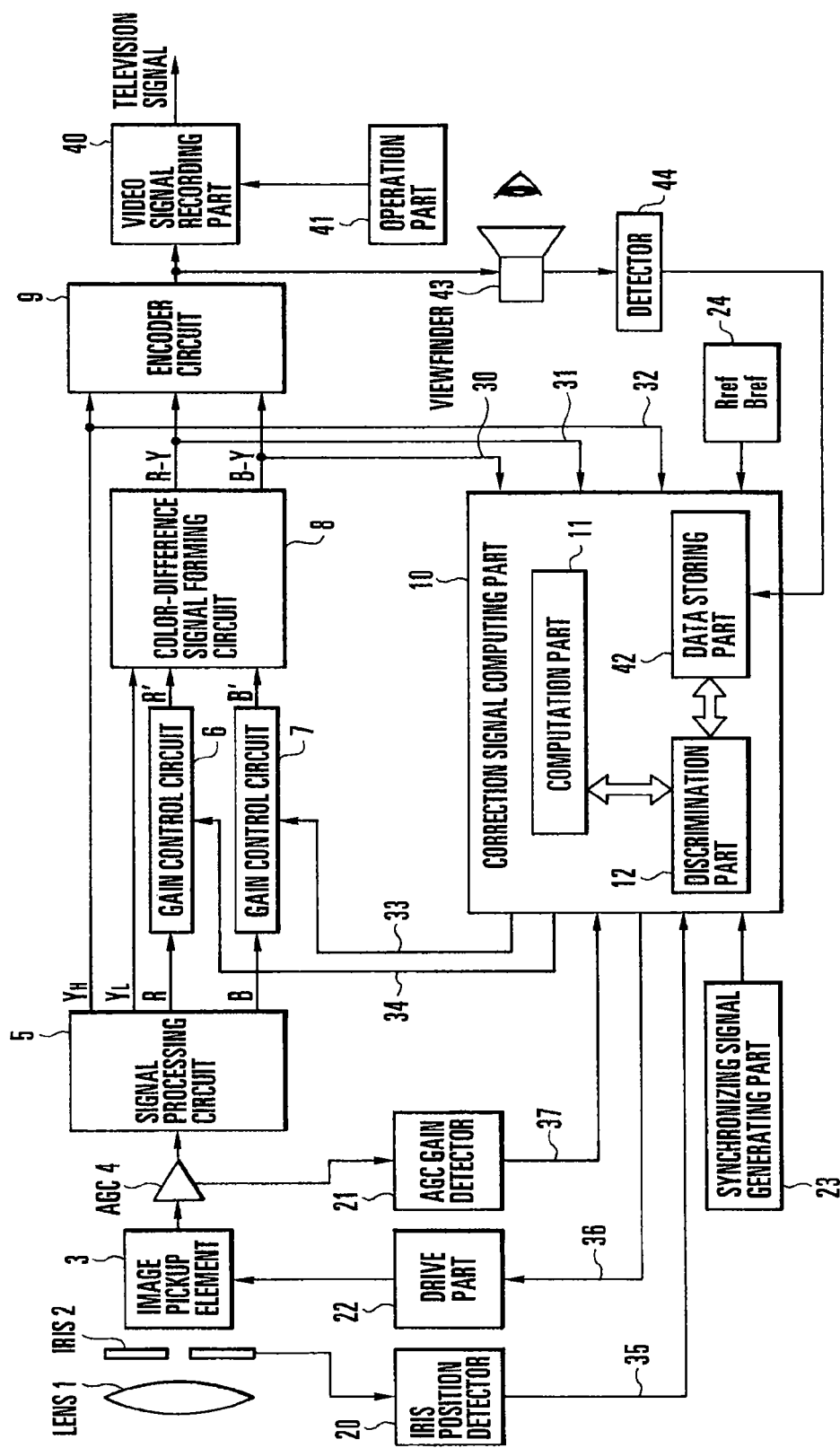
FIG. 8 is a block diagram illustrating another embodiment according to the present invention.

FIG. 8 is a block diagram illustrating another embodiment of the invention in which similar elements to those in FIG. 1 are denoted by the same reference numerals as those in FIG. 1. In FIG. 8, reference numeral 43 denotes a viewfinder for observing an object, and reference numeral 44 is a detector for detecting whether an operator is observing the viewfinder 43.

In this embodiment, the detector 44 serves as the object detection means in the previous embodiment. The detector 44 makes the data storing part 42 active only when the operator is observing the viewfinder 43, by detecting, for example, the contact of a part of the human body with a fringe of the viewfinder, the reflection of light from the eye, or the like.

The viewfinder 43 displays a video image being picked up on its screen by electrical or optical means. If the detector 44 detects that an operator is observing the viewfinder 43, the detector 44 transmits a signal to the data storing part 42. When the operator is observing the viewfinder 43, it can be considered that an object that the operator desires to pick up is being picked up. Therefore, in this case, information about a state of illumination onto the object is highly reliable. Thus, the information about a state of illumination is stored in the data storing part 42 when the operator starts or stops observing the viewfinder 43 or otherwise at a proper time when the operator is observing the viewfinder 43.

In this way, the information about a state of illumination onto the object is stored, and this information is used when the power supply is turned on next time so that the white balance is correctly adjusted automatically for arbitrary object. As can be seen from the above description, the present embodiment of the invention thus provides improvements in accuracy and reliability in the white balance adjustment.

What is claimed is:

1. An image pickup apparatus comprising:
  a memory which stores brightness of an object picked-up by an image pickup device, wherein the stored brightness is obtained during an image pickup by the image pickup device;
  an extracting range changing device which moves an extracting range of an image signal regarded as an achromatic signal, output from said image pickup device, based on a current brightness and the stored brightness;
  a white balance control device which controls white balance on a basis of a gain correction signal obtained by comparing a reference image signal with the image signal extracted from the range moved by said extracting range changing device, and
  a holding device which holds the obtained brightness in response to a stopping operation of image recording being implemented,
  wherein the current brightness is obtained after a turning on operation of the power supply is implemented.

2. An apparatus according to claim 1, further comprising:
  a recording device that records the image signal controlled by said white balance control device; and
  wherein said brightness is stored in said memory in response that recording of the image signal is stopped.

3. An apparatus according to claim 1, wherein said extracting range changing device extends the extracting range to extract the achromatic image signal in a case where difference between the current brightness and the stored brightness is more than a predetermined value.

4. An apparatus according to claim 1, wherein said extracting range changing device narrows the extracting range to extract the achromatic image signal in a case where the difference between the current brightness and the stored brightness is less than a predetermined value.

5. An apparatus according to claim 1, wherein the current brightness is obtained immediately after a turning on operation of the power supply is implemented.

6. An image processing method for processing an image pick-up by an image pickup device comprising;
  storing brightness of an object pick-up by an image pickup device, wherein the stored brightness is obtained during an image pickup by the image pickup device;
  moving an extracting range of an image signal regarded as an achromatic signal, from said image pickup device based on a current brightness and the stored brightness;
  controlling white balance on a basis of a gain correction signal obtained by comparing a reference image signal with the image signal extracting from the range moved in extracting range setting; and
  holding the obtained brightness in response to a stopping operation of image recording being implemented,
  wherein the current brightness is obtained after a turning on operation of the power supply is implemented.

7. An image processing method according to claim 6, wherein the current brightness is obtained immediately after a turning on operation of the power supply is implemented.

* * * * *